(12) United States Patent
Kempf (10) Patent No.: US 8,413,756 B2
(45) Date of Patent: Apr. 9, 2013

(54) ROVER WHEEL

(75) Inventor: James Kempf, WallKill, NY (US)

(73) Assignee: Production Resource Group, L.L.C., New Windsor, NY (US)

( * ) Notice: Subject to any disclaimer, the term of this patent is extended or adjusted under 35 U.S.C. 154(b) by 0 days.

(21) Appl. No.: 13/357,860

(22) Filed: Jan. 25, 2012

(65) Prior Publication Data

US 2012/0186893 A1    Jul. 26, 2012

Related U.S. Application Data (60) Provisional application No. 61/436,294, filed on Jan. 26, 2011.

(51) Int. Cl.
*B60K 17/342*    (2006.01)
(52) U.S. Cl.
USPC ......................................................... 180/251
(58) Field of Classification Search .................. 180/251, 180/233, 234, 65.6; 301/6.1
See application file for complete search history.

(56) References Cited

U.S. PATENT DOCUMENTS

| | | | | |
|---|---|---|---|---|
| 4,335,626 A | * | 6/1982 | Fisher | 74/496 |
| 4,657,463 A | * | 4/1987 | Pipes | 414/495 |
| 5,139,279 A | * | 8/1992 | Roberts | 180/409 |
| 5,752,710 A | * | 5/1998 | Roberts | 280/91.1 |
| 5,921,338 A | * | 7/1999 | Edmondson | 180/65.51 |
| 7,597,160 B2 | * | 10/2009 | Lawson, Jr. | 180/6.48 |
| 2003/0230450 A1 | * | 12/2003 | Imberi | 182/13 |
| 2012/0179337 A1 | * | 7/2012 | Doan | 701/49 |

* cited by examiner

*Primary Examiner* — Tashiana Adams
(74) *Attorney, Agent, or Firm* — Law Office of Scott C. Harris, Inc.

(57) ABSTRACT

A movable and steerable device that has a platform with four wheel assemblies, any of which are both drivable and steerable. Different driving and steering options can make the device move in different directions and orientations. The driving can be done by a drive motor, forming a drive loop of material, such as chain, and a steering motor, also forming a steering loop. The different loops are attached to different sprockets on the device, which have different sizes, and therefore the different loops do not interfere with one another.

12 Claims, 16 Drawing Sheets

ROVER WHEEL

This application claims priority from provisional application No. 61/436,294, filed Jan. 26, 2011, the entire contents of which are herewith incorporated by reference.

BACKGROUND

Roving deck wheels can be used to move along a stage, e.g., on tracks, or in steerable directions. These may be used during a stage performance, or to hold materials for a stage performance.

SUMMARY

The present application describes a custom movable wheel assembly for making roving deck units of various configurations, along with driving and steering assemblies for the wheel assembly.

According to embodiments, the wheel has both drive and steering, both driven by sprockets, using chain loops over individual gear-motors that are battery powered and remote controlled.

DETAILED DESCRIPTION

Figure 1:
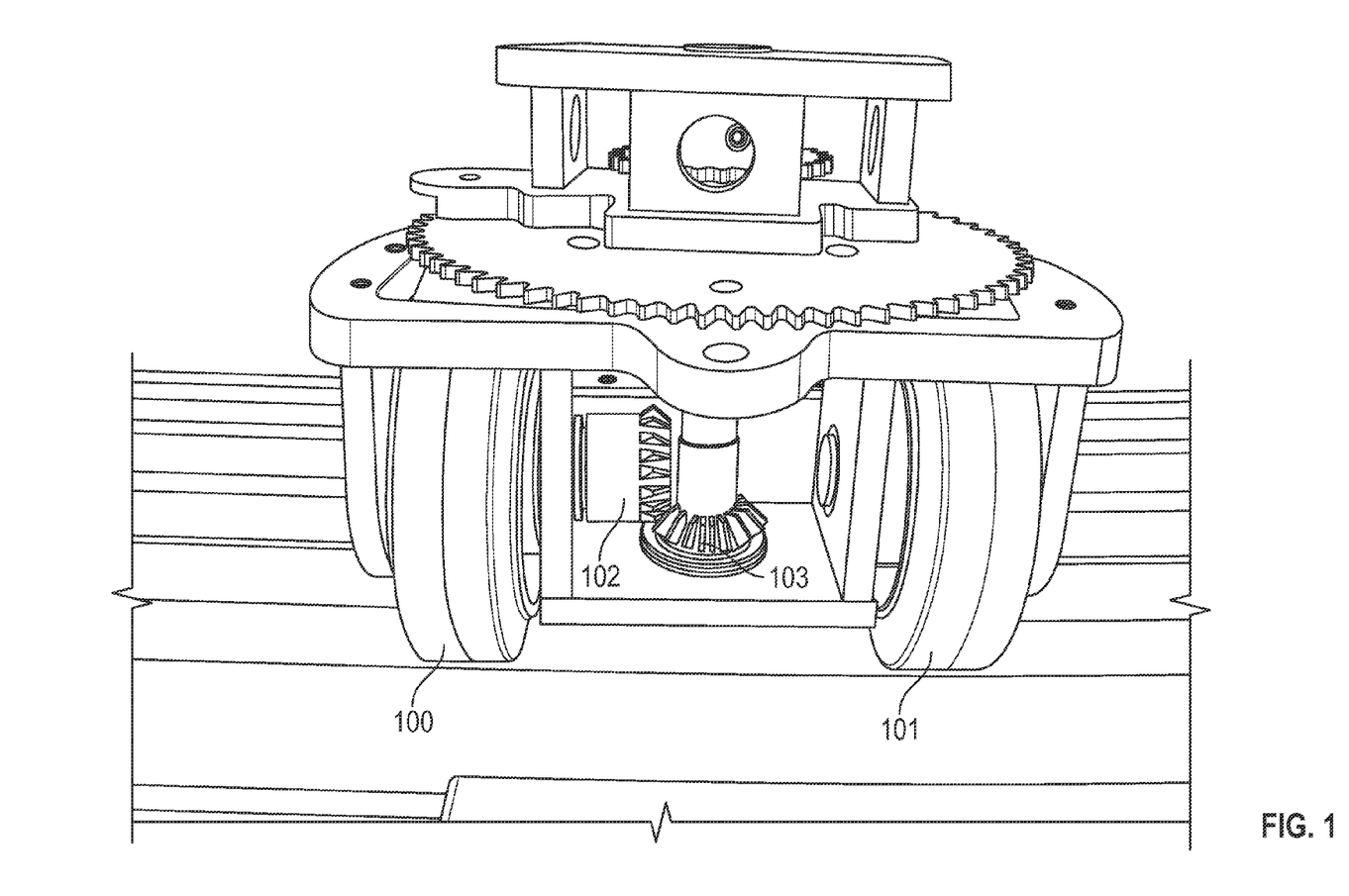
FIG. 1 shows a front on view of the Rover wheel assembly on a platform.

FIG. 1 illustrates the basic wheel assembly device that forms part of the rover wheel. The wheel assembly shows two wheels 101, 102. In this embodiment, one of the wheels 100 is driven by a sprocket 102 that is itself driven by a gear drive 103. The gear drive 103 drives the driven wheel based on driving force received from the main drive system.

Figure 2:
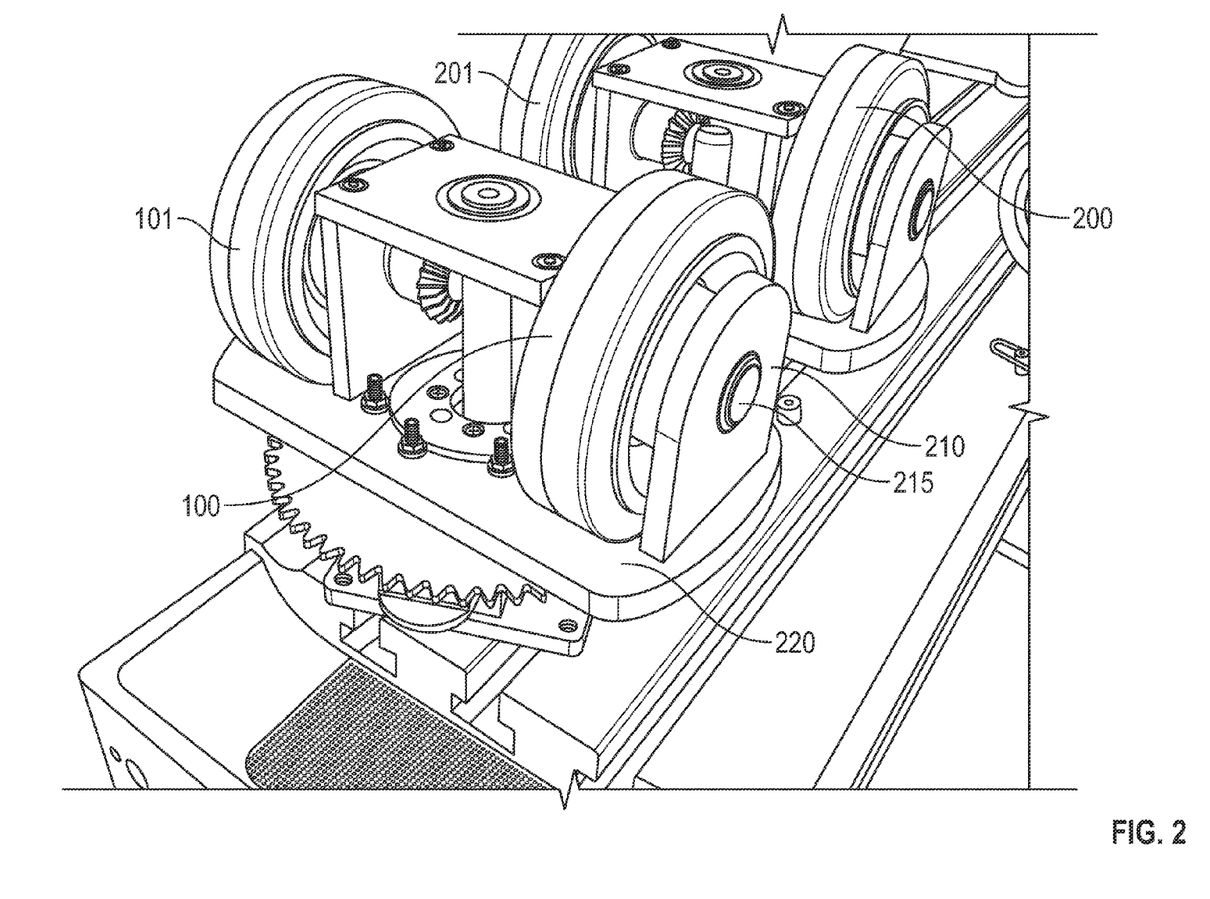
FIG. 2 shows a bottom view of the Rover wheel assembly and platform.

FIG. 2 shows the wheel assembly device from its bottom-most portion, showing the wheel assemblies 100, 101, 200, 201. Each of the wheels may include a gear drive, or alternatively only some of them might include a gear drive. For example in one embodiment, only one of the wheels includes a gear drive. The wheels such as 100, 101 are mounted to wheel supports 210, via an axle 215. The wheel supports 210 become part of the wheel support assembly device 220.

Figure 3:
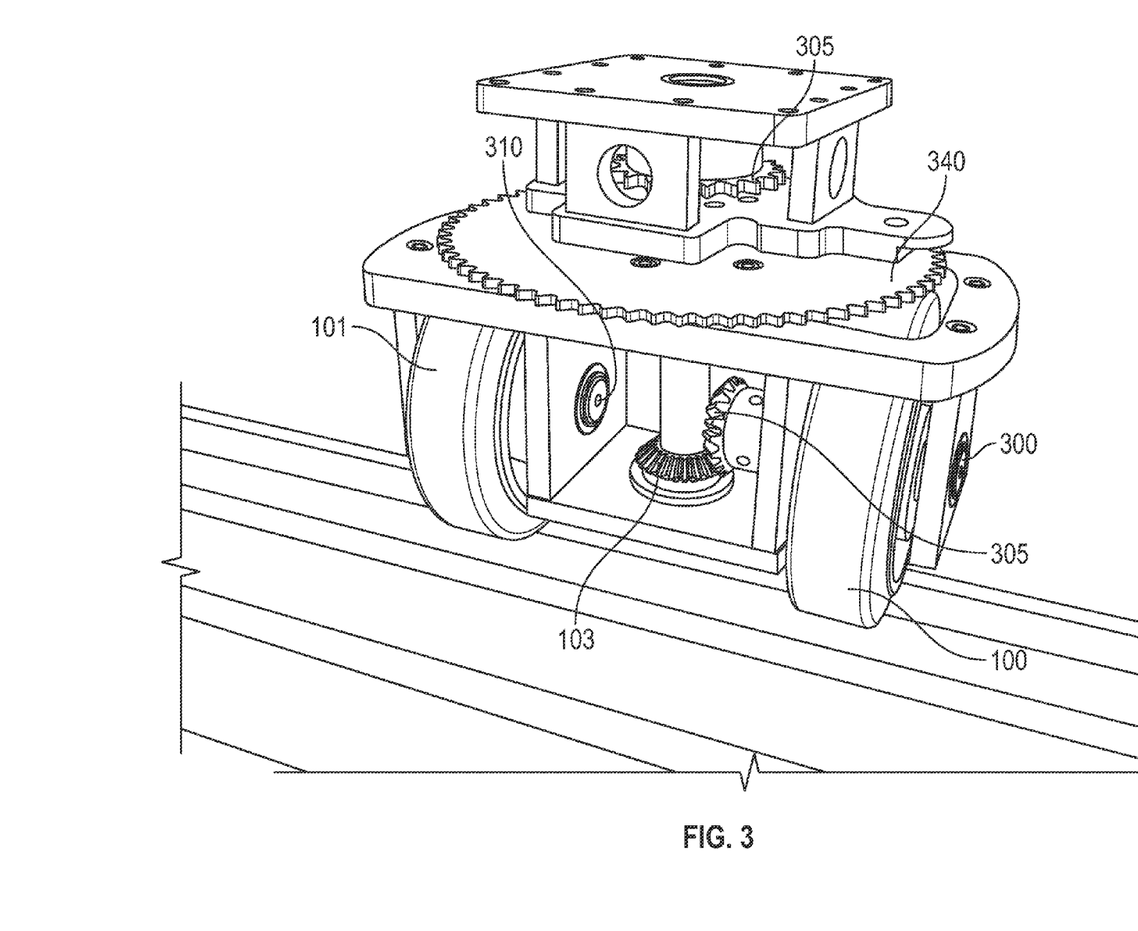
FIG. 3 shows a front view of a single Rover wheel, showing the gears.

FIG. 3 illustrates the rover wheel assembly of FIG. 1 from the rear, showing the wheels, and how the wheels are connected. The wheel 100 has an axle portion 300 on one side, with a driven sprocket 305 on its other side, driven by the sprocket connection 103. The wheel 101 maybe completely free driven, and shows the axle connection 310 which allows the wheel 101 to freely move. FIG. 3 also shows different disc shaped driving portions forming driving sprockets 340 and 315. One of the sprockets is used for steering the wheels to point the rover. The other sprocket is driven to drive the driving sprockets 305.

Figure 4:
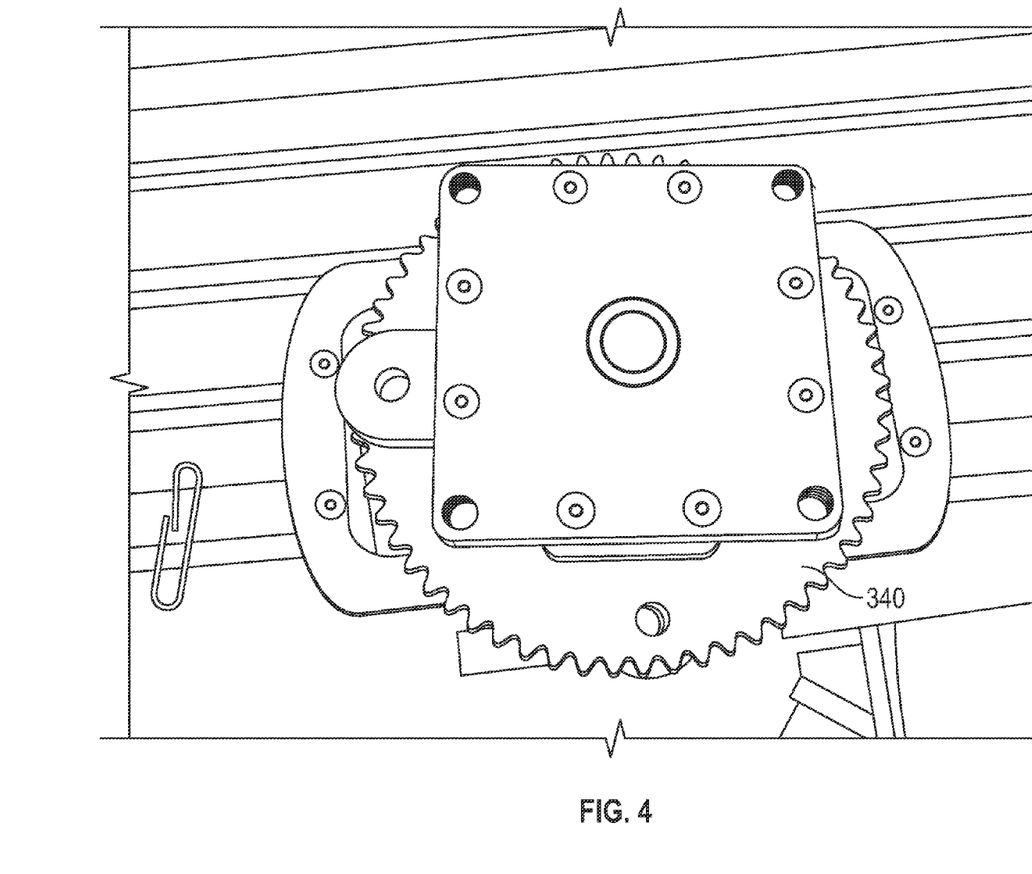
FIG. 4 shows a top view of the Rover wheel assemblies.

FIG. 4 shows a top view of the rover, showing a connection to the rover and the different driving sprockets.

Figure 5:
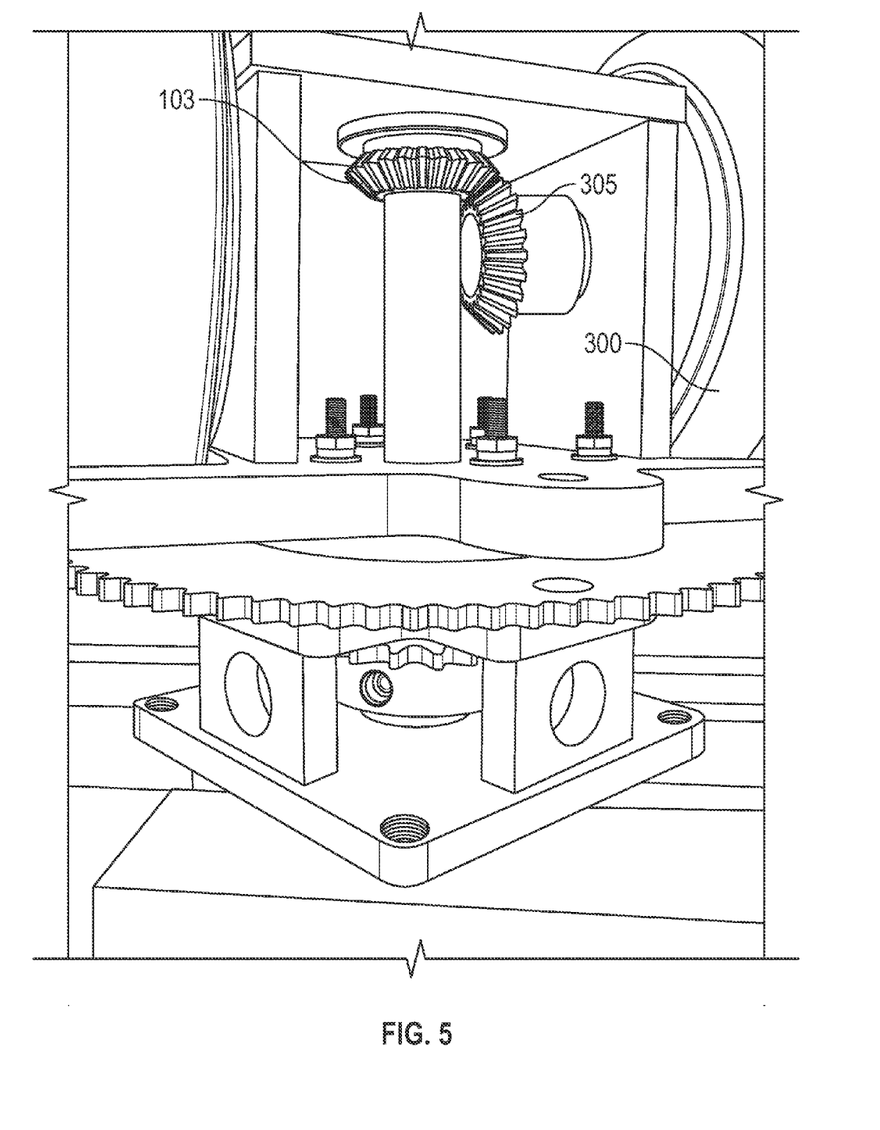
FIG. 5 shows a close-up of the Rover wheel assembly.

FIG. 5 shows him a detailed view showing the different sprockets, how the sprocket 305 is connected to the driven wheel 300.

FIGS. 6-11 show the way the wheel assemblies can be used to form a rover device. The basic rover device shown in FIG. 6 includes a rover platform 600 having four wheel assemblies 610, each of the wheel assemblies having generally the structure shown in FIGS. 1 through 5.

In this embodiment, each of these wheel assemblies includes first and second wheels, one of which is driven in the other of which is free-rotating. Each wheel assembly also includes two concentric sprockets, including the larger steering sprocket 340 shown in FIG. 3, and the smaller driving sprockets 305 shown in FIG. 3, although the two sprockets can be reversed.

Figure 6:
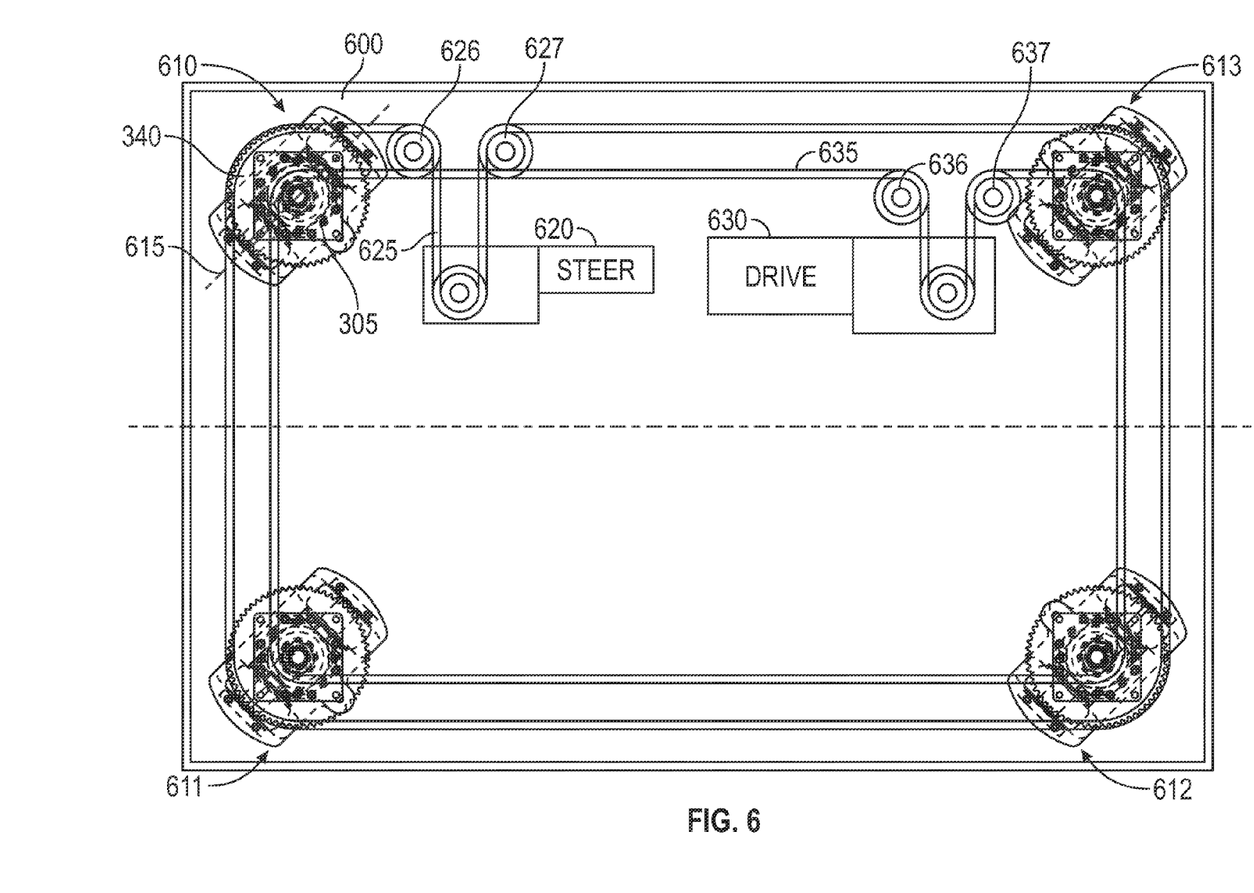
FIG. 6 shows an embodiment of the Rover wheel platform and the steering and drive mechanism for four-wheel steering.

In operation, the rover device uses two different motors, which can be attached to the platform 600. The first motor 620 is connected via a steering chain 625 to the larger sprocket 340 on the wheel assembly 610, and forms a complete loop connected to corresponding sprockets on wheel assemblies 611, 612 and 613. In this embodiment, moving the steering motor causes the direction of the wheels to change in pointing direction.

FIG. 6 shows an embodiment in which each of the wheel assemblies are pointed in the same direction. In FIG. 6, each of the wheel assemblies points in the same direction relative to an axis 615 which passes through the center line of the wheel assembly 610. Moreover, those axes can be changed by the moving of the steering motor in either the forward or reverse direction. The steering motor can be, for example, a ⅛-¼ horsepower 24 V DC gear motor or servomotor.

The chains can be driven by the chain drive as shown, over different idlers, with the steering chain 625 driven across idlers 626, changing direction at each of the gears on the wheels, back to idlers 627. In a similar way, the drive chain 635 can be driven across idlers 636, 637.

A drive motor is connected to the smaller sprockets on each of the wheels, in a similar way. The drive motor 630 is connected to a second chain 635 which connects to the sprocket 305 on the wheel assembly 610, and also in the wheel assemblies 611, 612, 613 and 614. Note that since the sprockets are of different sizes, the chains which drive these sprockets will always be at different locations. This prevents the sprockets and the chains from coming into contact with and possibly interfering with one another.

The configuration of FIG. 6 has the steering mechanism and a drive mechanism commonly attached to all the sprocket portions. This can be used to carry out a four wheel "crab" steering, which can allow the device to move in any path straight diagonal or curved. The centerline of the platform can stay parallel to the plaster line, as shown.

Figure 7:
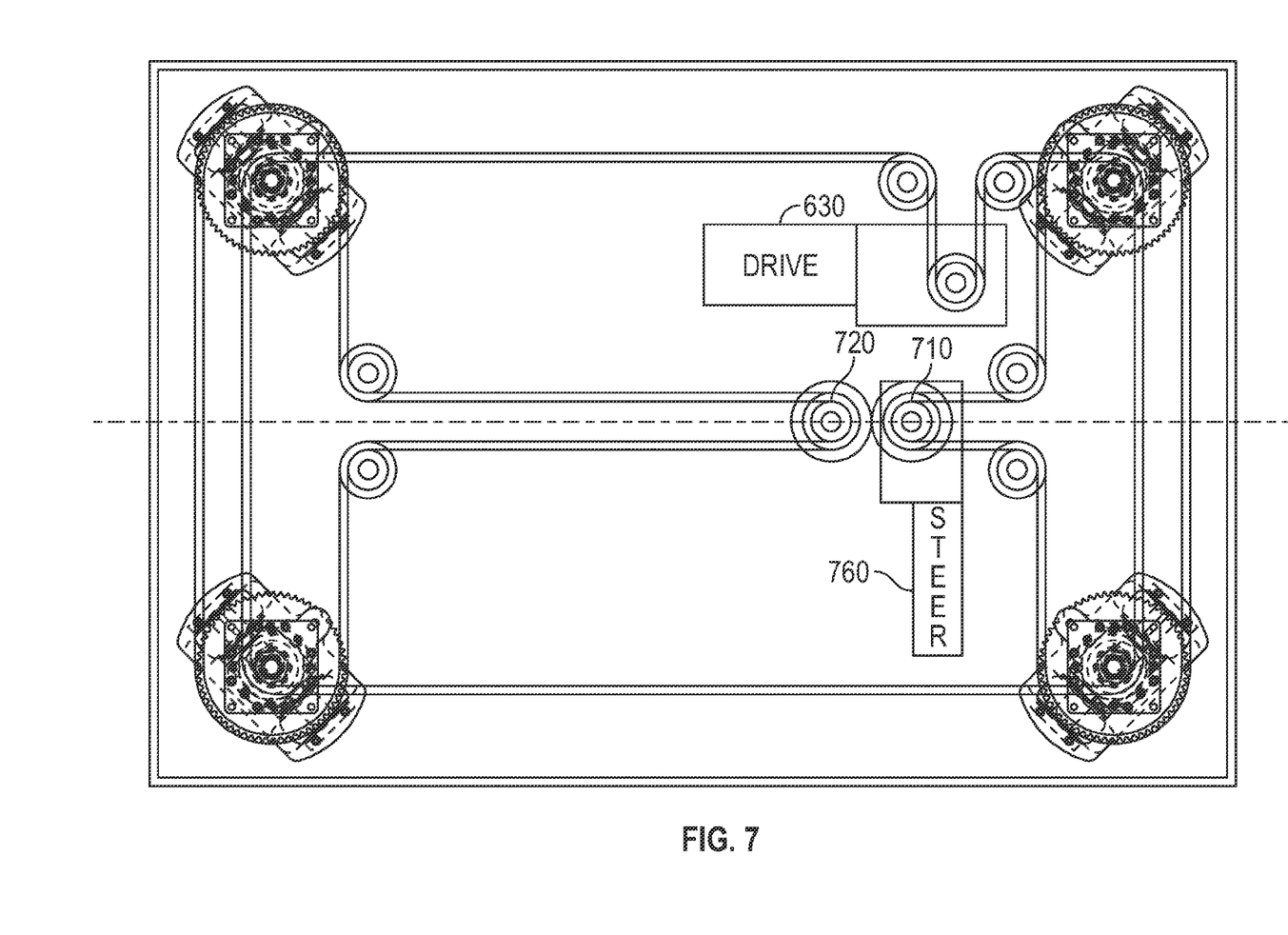
FIG. 7 shows an alternative embodiment with four wheel opposite steer.

FIG. 7 shows an alternative embodiment, which provides four-wheel, front-rear wheel opposite steer. The center line of the wagon follows the travel path as desired. In this embodiment, the drive motor 630 is connected to the all wheels, as in the first embodiment. However the steering motor 700 has two different outputs 710, 720 which are connected to the opposite wheels. The connection 710 causes the front wheels to point in the same direction, and causes the back wheels flowing in the same direction, however these directions are opposite.

Figure 8:
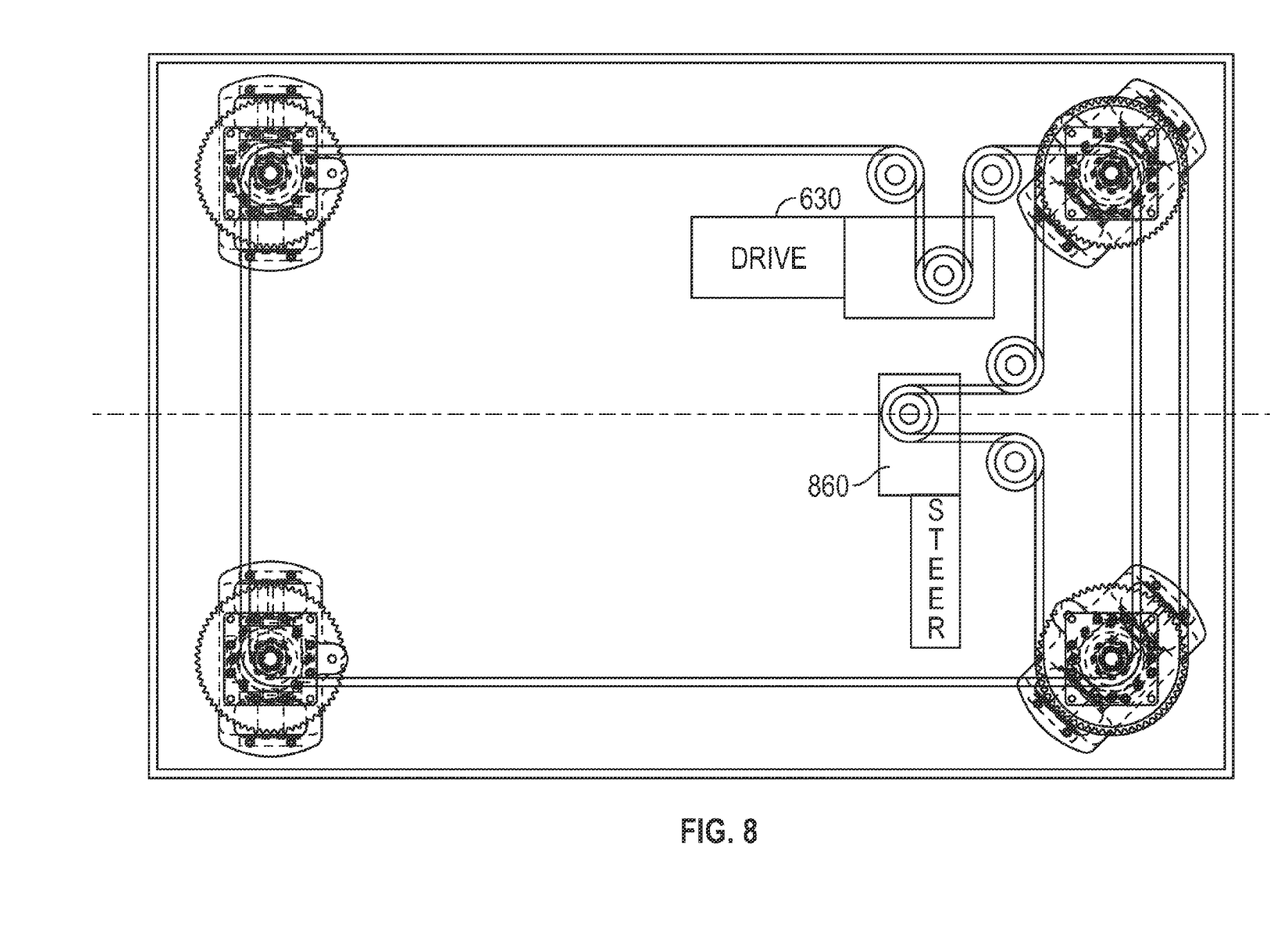
FIG. 8 shows an embodiment with two wheel steering.

FIG. 8 shows an alternative embodiment which uses two wheel automotive style steering. In this embodiment, the steering drive 800 is connected only to the front wheels, while the rear wheels are constrained to stay straight, thereby providing automotive style steering.

Figure 9:
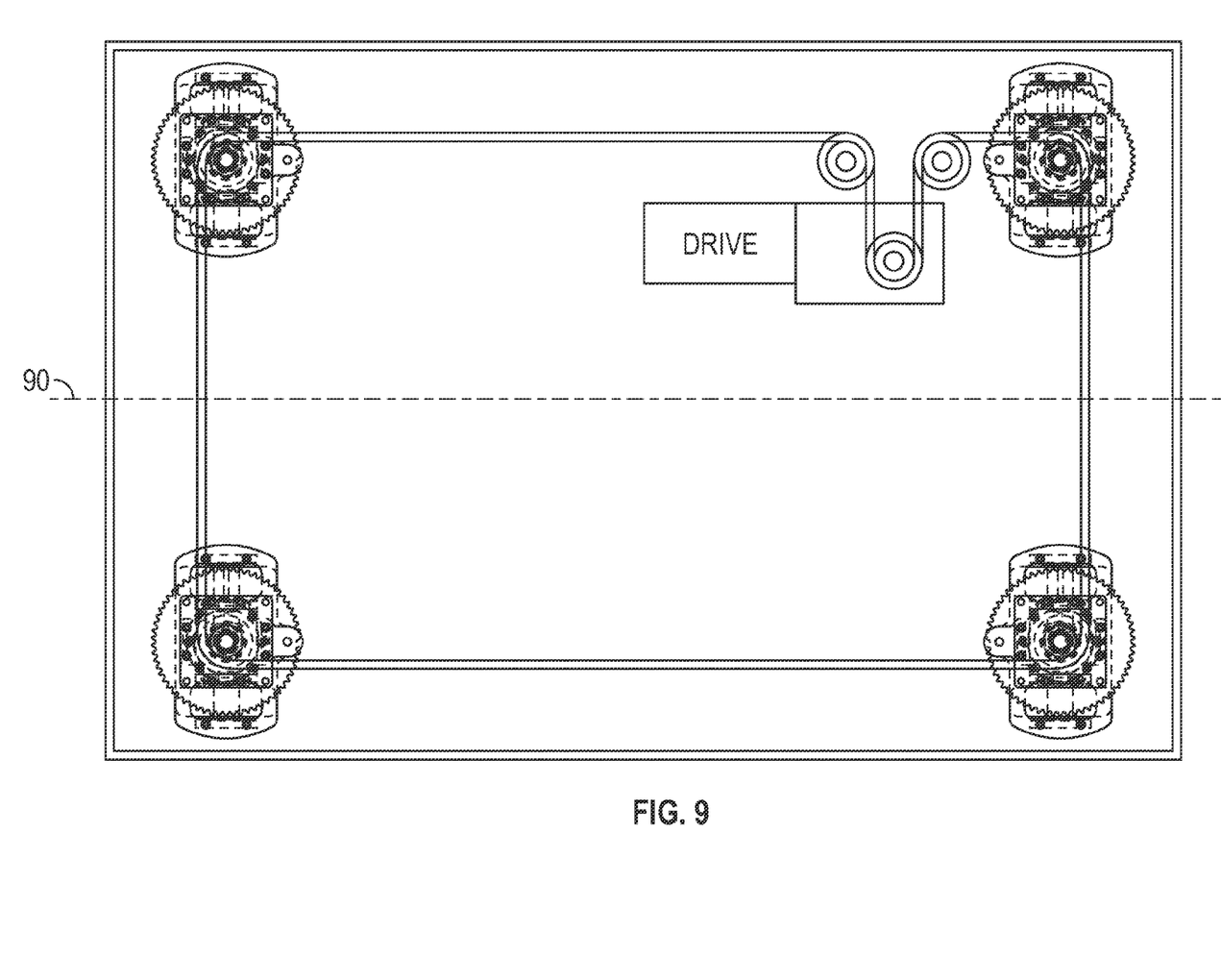
FIG. 9 shows an embodiment with no steering and 4 wheel drive.

In other embodiments, the steering can be locked in any desired way, by maintaining the wheels in a locked direction as shown in FIG. 9. This constrains the wheels to only move straight along the wagon center line 900.

Figure 10:
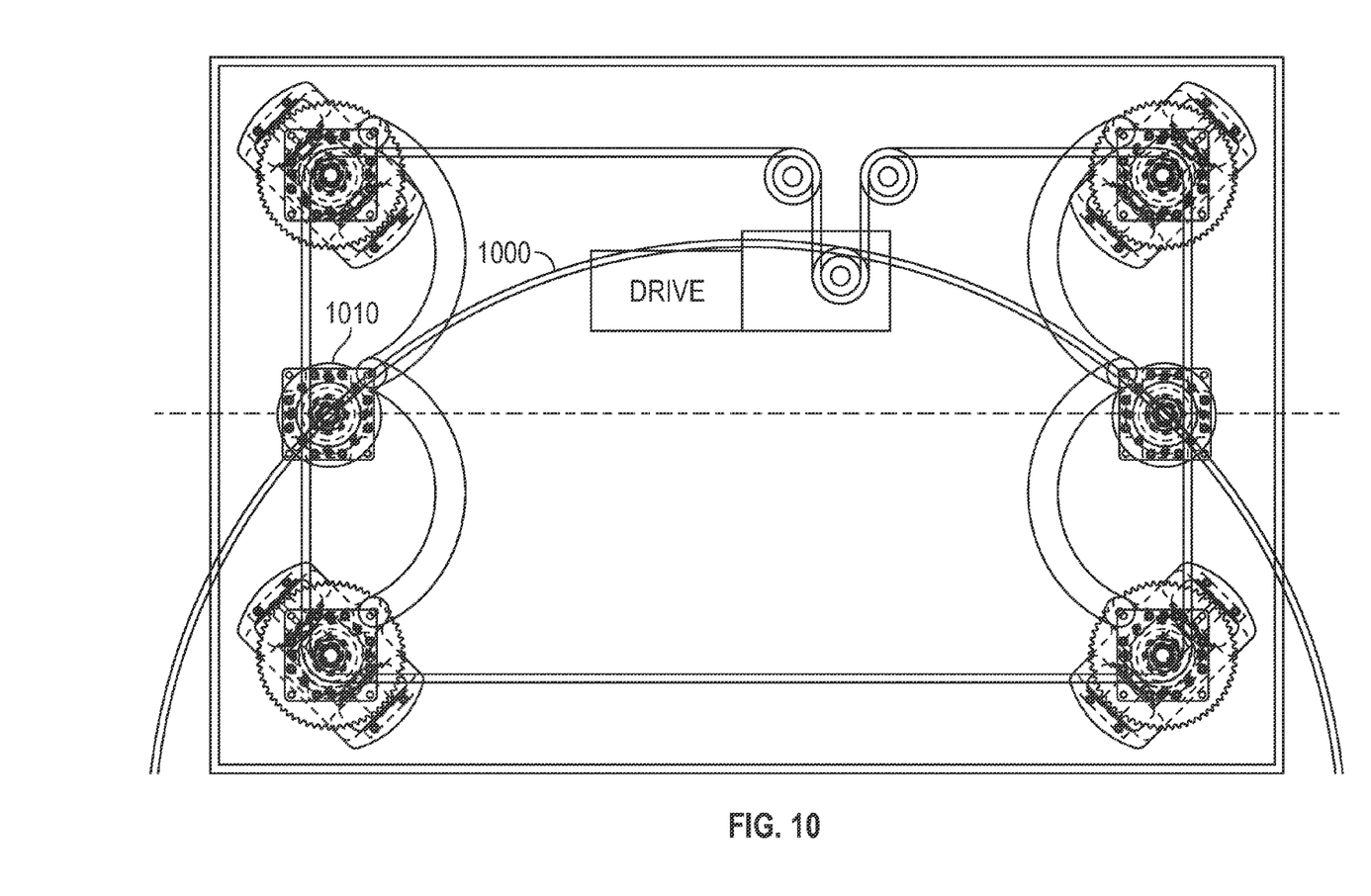
FIG. 10 shows an embodiment which operates along a track.

The steering can also be passive, as shown in FIG. 10, in which case the device may be guided along knives or other guiding devices maintained within guide grooves or holders such as 1010.

Figure 11:
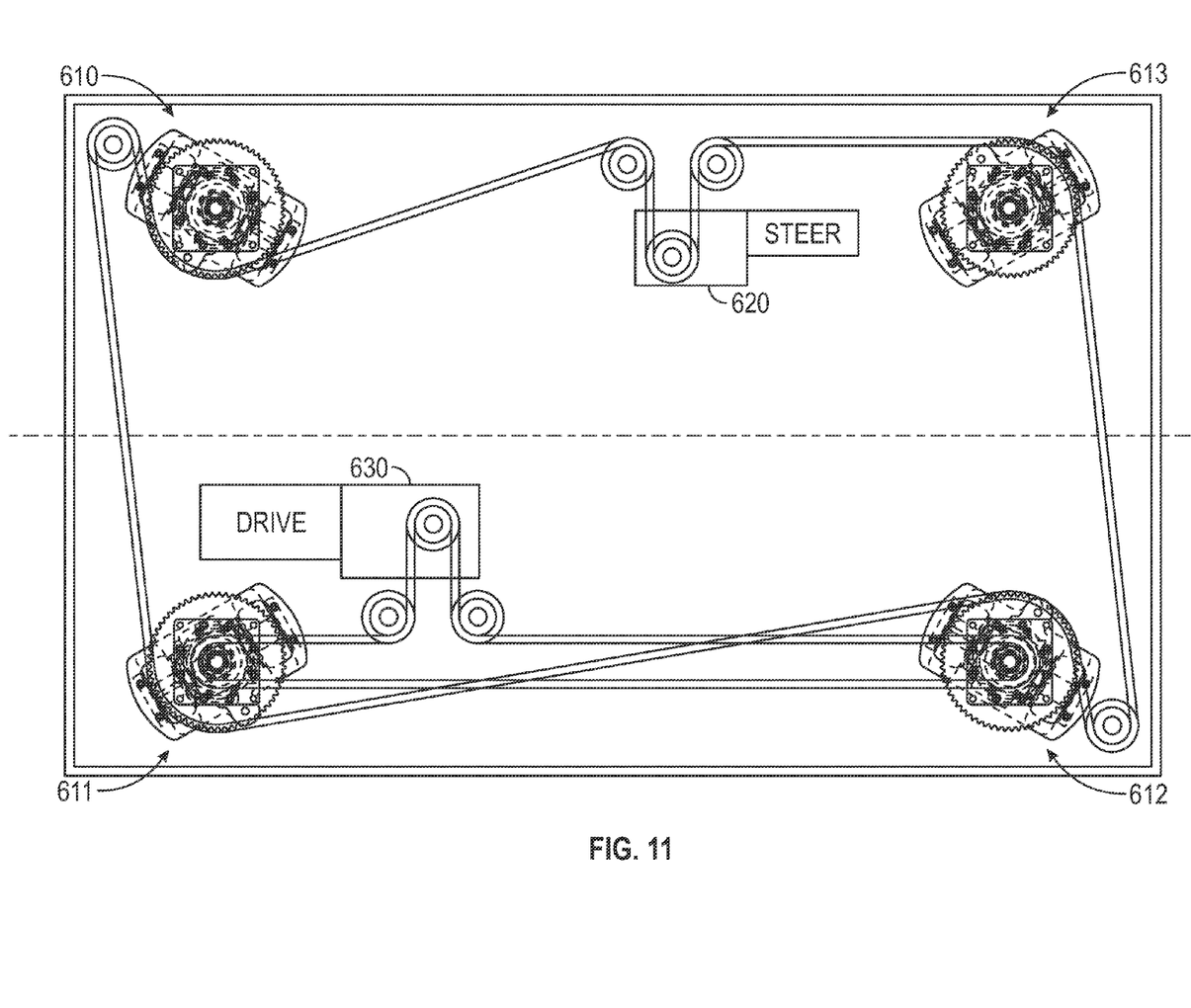
FIG. 11 shows an embodiment with opposite steering.

FIG. 11 shows an alternative embodiment with two wheel drive, and four wheel diagonal and equal and opposite steer. This moves in a straight path and rotates in place only. In this embodiment, the drive motor 630 connects only to two of the wheel assemblies 611, 612. The steering motor 620 connects to all four wheels, however, causes the two diagonal wheels 610, 612 to face in the same direction, and the other two diagonal wheels 611, 613 to face in the same direction different. Other forms of driving and starting can be used.

Figure 11A:
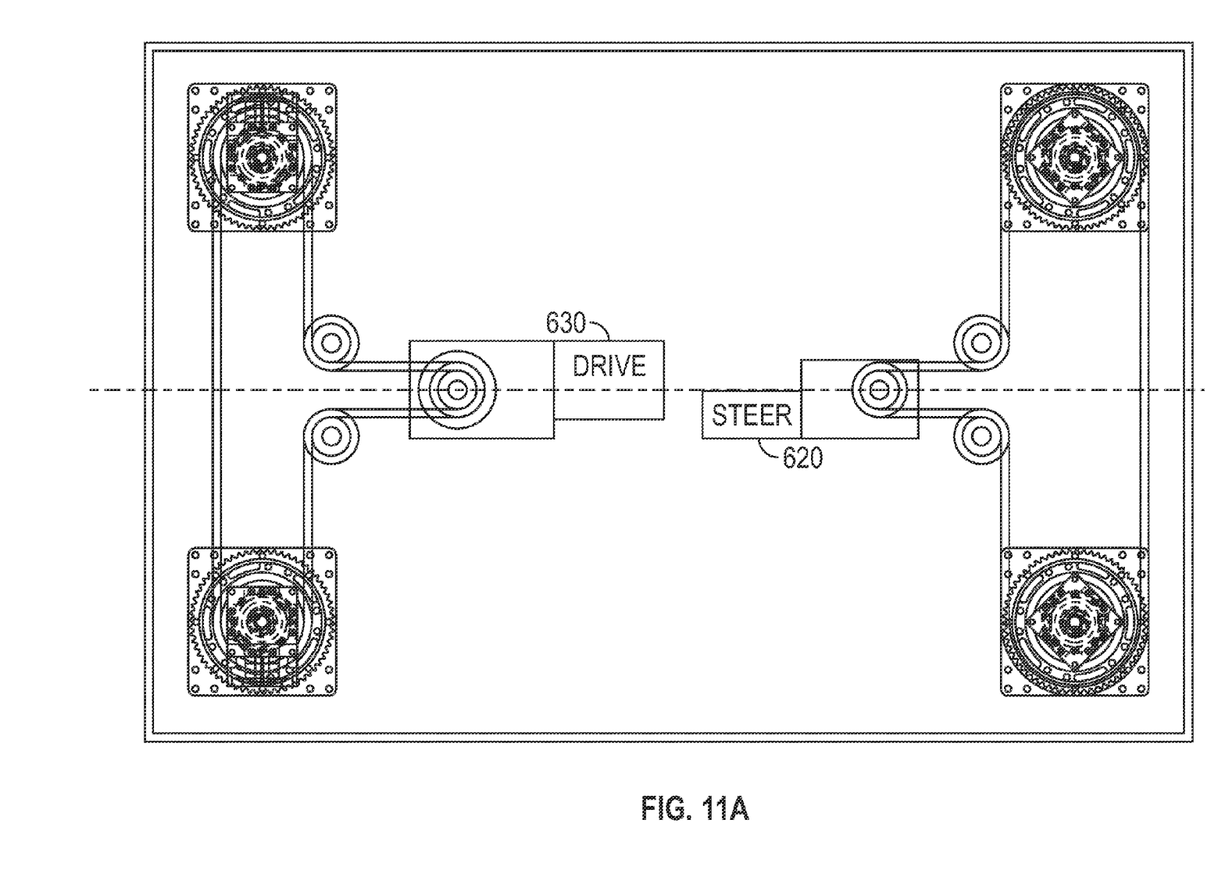
FIG. 11A shows an embodiment with opposite steering and drive.

FIG. 11A shows yet another modification, in which the drive motor 630 drives only the rear wheels, and the steering motor 620 drives only the front wheels. This provides a two rear wheel automotive style drive with two front wheel automotive style steering.

Different drive connections of these types can be used.

Figure 12:
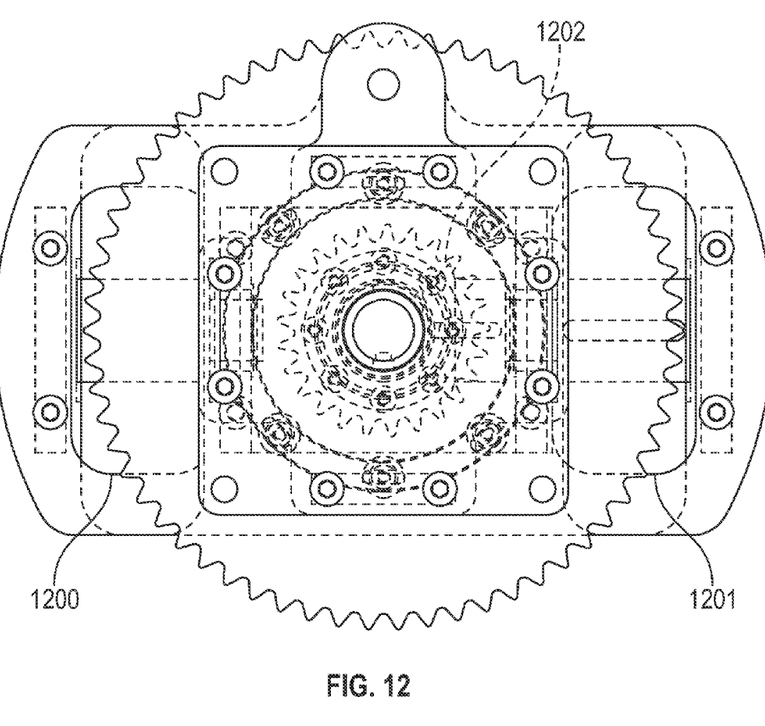
FIG. 12 shows an assembly drawing of the Rover wheel assembly in a plan view.
Figure 13:
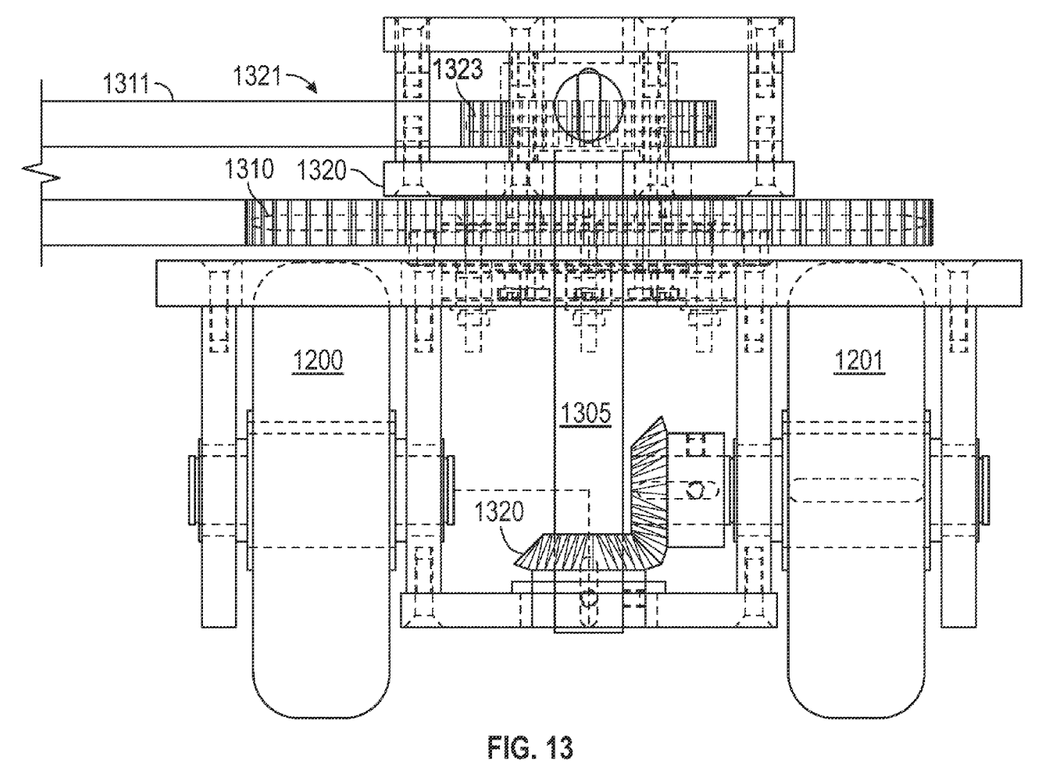
FIG. 13 shows a front view of the wheel assembly.
Figure 14:
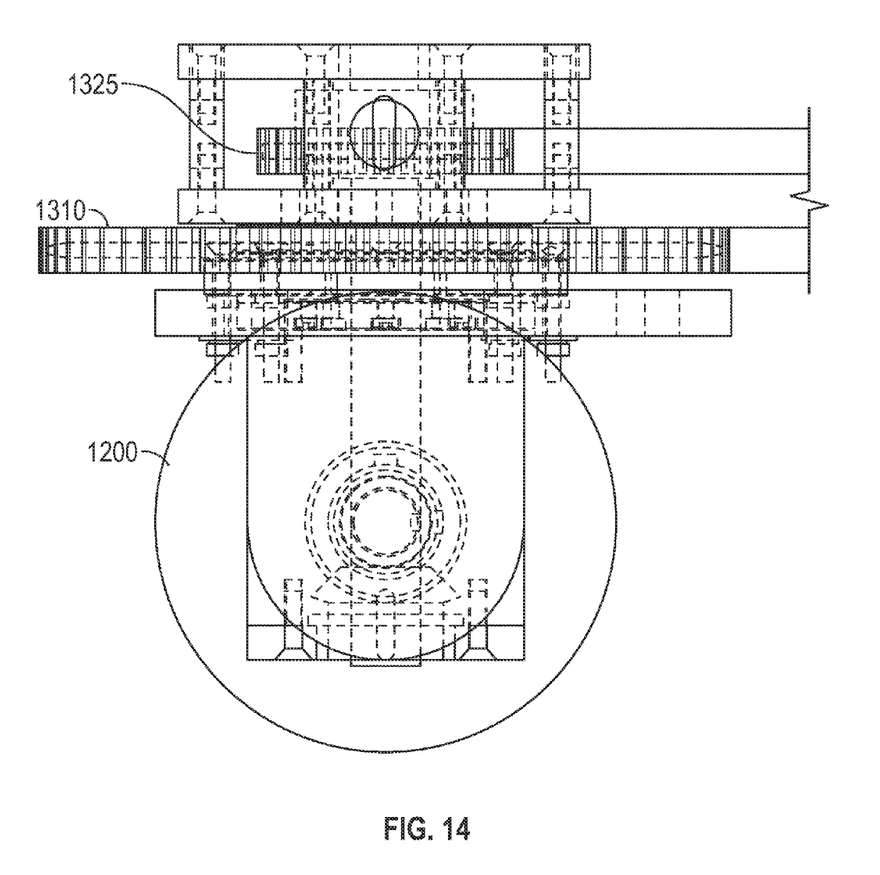
FIG. 14 shows a close-up of the wheel portion of the Rover wheel assembly in a side view.

FIGS. 12, 13 and 14 show assembly diagrams of the wheel assembly device. FIG. 12 shows a plan view, showing the wheels 1200, 1201. The wheel 1200 is freely moving, while the wheel 1201 includes the drive gear 1202. This wheel assembly is connected to a platform to form the rover as described above.

FIG. 13 illustrates a front view of the wheel assembly, showing the wheels 1200 1201, and the driving gear 1202. In the FIG. 13 embodiment, the gear 1202 is shown connected to the driven gear 1300, which itself is connected via a driving shaft 1305 to sprocket 1310 that is driven by the chains as described herein.

1311 illustrates the location of the chain drive loop to drive the wheels. The second chain drive loop is shown as 1321, connecting to the other sprocket 1325 that connects to a bearing top plate 1330 which itself is connected to change the direction in which the wheels are steered.

FIG. 14 shows a side view, showing one of the wheels 1200, and also showing the sprockets and connections.

Figure 15:
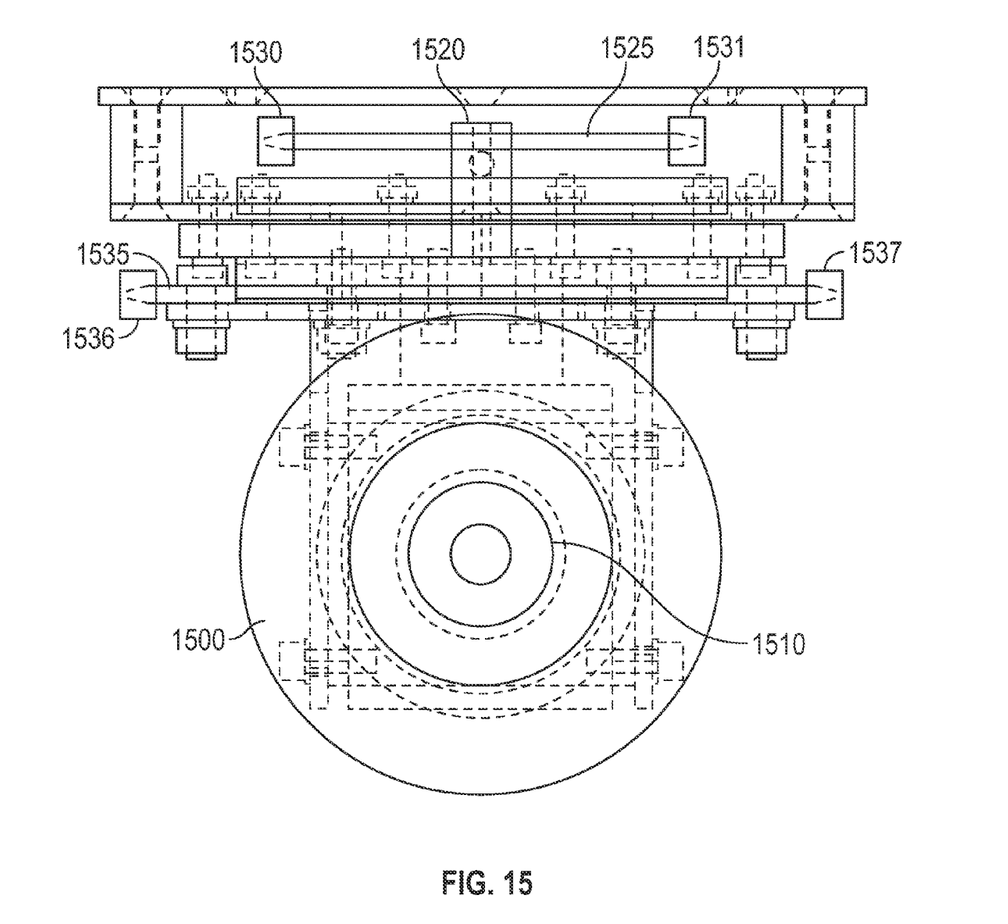
FIG. 15 shows an alternative embodiment of the Rover wheel assembly.

FIG. 15 shows an alternative construction for the drive wheel assemblies according to an alternative embodiment. In FIG. 15, the wheel 1500 is shown held on a keyless bushing 1510. The wheel itself can be moved by its connection at 1522. The drive sprocket 1525 that includes the chain loop thereon shown generally as 1530, 1531. The chain loop causes movement of the shaft 1520 which correspondingly moves the wheel. In a similar way, the wheel can be rotated as in the other embodiments by applying electromotive force to the sprocket 1535 via the chain loop shown as 1536, 1537.

Other embodiments are contemplated. For example, other ways of driving the individual devices can be used. For example, belts can be used instead of chains, and other kinds of materials can be used.

What is claimed is:

1. A movable and steerable device comprising:
a platform;
first, second, third and fourth wheel assemblies connected to the platform, each of said wheel assemblies having wheels which are steerable into different directions;
at least two of said wheel assemblies being actively steered wheel assemblies, whose positions are moved to steer said platform;
at least two of said wheel assemblies being driven wheel assemblies that include a drive portion which drives movement of said platform;
a drive motor, driving a drive loop of, said drive loop connected all of said driven wheel assemblies, and providing drive power for said at least first and second wheel assemblies which drives said first and second wheel assemblies in a desired direction;
a steering motor, driving a steering loop of material, said steering loop connected to all of said steered wheel assemblies, and steering said steered wheel assemblies,
each of said wheel assemblies having first and second driven disk shaped portions, where said first driven disk shaped portion rotates in a horizontal plane and is connected to
and drivable by said drive loop of material and where said second driven disc shaped portion also rotates in the horizontal plane and is connected to be driven by said steering loop of material, said first and second driven disc shaped portions being concentric to one another and having different outer diameters.

2. The device as in claim 1, wherein said loops of material are loops of chain, and said disc shaped portions that include sprockets on their outer surfaces.

3. The device as in claim 1, wherein said driven wheel assemblies are driven commonly and in sync by the steering motor, and said actively steered wheel assemblies are commonly steered by the driving motor.

4. The device as in claim 3, wherein said steered wheel assemblies are steered in the same direction.

5. The device as in claim 1, wherein all four wheel assemblies are driven by the drive motor.

6. The device as in claim 4, wherein all wheel assemblies are commonly driven to a common angle relative to an axis of the platform.

7. The device as in claim 5, wherein said drive loop and said steering loop form two different size loops of said material, one concentrically inside the other.

8. The device as in claim 4, wherein some wheel assemblies are driven to different angles relative to an axis of said platform as compared with other wheel assemblies.

9. The device as in claim 1, wherein all wheel assemblies are driven for driving, but only two wheel assemblies are driven for steering.

10. The device as in claim 1, wherein each of said wheel assemblies includes first and second wheels, which rotate on a common axis.

11. The device as in claim 10, wherein one of said wheels rotates freely and another of said wheels is driven to rotate via said drive loop.

12. The device as in claim 11, wherein said one of said wheels has a free running axle, and the other said wheels has a drive sprocket.

* * * * *